Sept. 30, 1952 S. K. LANDIS 2,612,382
TRAILER STABILIZING CONNECTION
Filed Oct. 19, 1950

INVENTOR
Samuel K. Landis.
BY
ATTORNEY

Patented Sept. 30, 1952

2,612,382

UNITED STATES PATENT OFFICE 2,612,382

TRAILER STABILIZING CONNECTION

Samuel K. Landis, Ephrata, Pa., assignor of one-half to Christian G. Landis, Quarryville, Pa.

Application October 19, 1950, Serial No. 190,997

6 Claims. (Cl. 280—33.9)

1

The present invention relates to trailer hitches and connections and more particularly to structure for reducing or substantially eliminating trailer sway, and relative swinging between the tow car in the trailer.

Trailer hitches for motor vehicles of the passenger car type usually hitch to the rear bumper and have no provision to eliminate or reduce swinging or swaying of the trailer while traveling at desirable highway speeds or traveling over rough roads. Also, most State laws require that a chain or cable be used as a safety device to guard against the danger of a broken coupling while in motion.

It is an object of this invention to provide in a single attachment for the underside of a trailer, novel means for substantially eliminating trailer sway and relative trailer and car swinging, while also guarding against disaster should the regular trailer hitch coupling break.

Another more specific object is to provide friction tension connections to reduce minor trailer sway forces and spring tension connections of relatively greater resistance than the friction tension to reduce relatively greater trailer sway forces.

Another object is to provide means to hold both the tow car and trailer in line in the straight-away, thereby reducing both air and road friction.

With the above and other objects in view which will be apparent as the description proceeds, the invention comprises the novel construction, combination and arrangement of parts hereinafter described and illustrated in the accompanying drawing.

In the drawing, wherein like reference characters refer to like parts throughout the specification:

Figure 1:
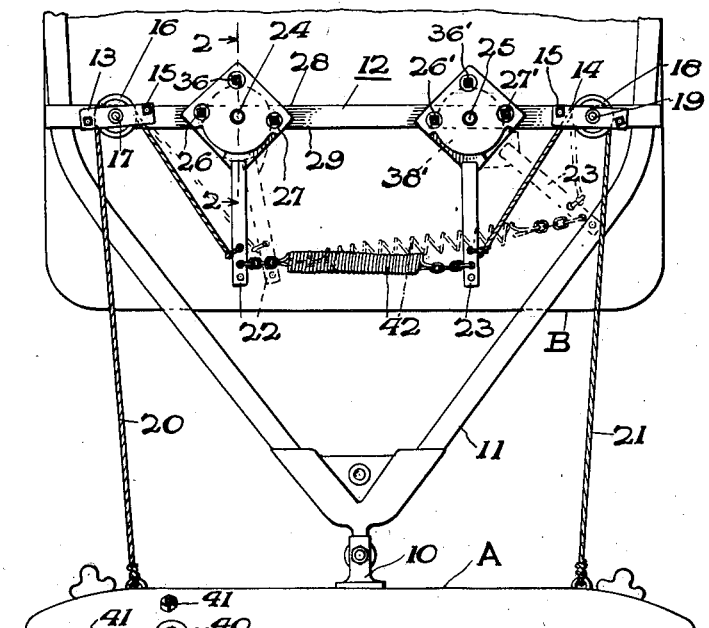
Figure 1 is a bottom plan view of the present invention shown attached to the underside of a trailer hitch and illustrating the action of the friction tension means and the spring tension means in solid and dotted line positions.

Referring in detail to the drawing and first with particular reference to Figure 1, there is shown the bumper A of a tow car of vehicle and a trailer B. The tow car carries the usual couper member 10 and the trailed the usual hitch 11. The hitch 11 as shown diverges from the coupler member 10 and extends along each side of the trailer. It is secured to the underside of the trailer B in any suitable manner and the support bar 12 of the present invention transversely spans the bottom of the trailer and is secured to the bottom side of the hitch 11.

The transverse support bar 12 serves to mount the several elements of the device on its underside or ground side. For example, duplicate straps 13 and 14 are secured adjacent each end of the bar by suitable means, such as bolts 15. The bolts are arranged so as to maintain the straps spaced away from the bottom face of the bar 12 at these points to leave a gap for a sheave or pulley, such for example as 16 journalled on spindle 17 between strap 13 and the bar 12 and such as sheave 18 journalled on spindle 19 between strap 14 and the bar. Cables 20 and 21 are looped over the pulleys 16 and 18, respectively. One end of cable 20 connects to the right rear side of the tow car A and the opposite end angles off from the pulleys 16 and connects to the perforated end of an arm 22 projecting from a friction means to be subsequently described. Cable 21 likewise connects to the left rear side of the tow car A and angles off from the pulley 18 and connects to the punctured or perforated end of an arm 23 projecting from a second friction means likewise to be subsequently described.

The support bar 12 at spaced apart medial points adjacent the pulley is formed with studs. One stud 24 is closer to pulley 16 and the other stud 25 is closer to pulley 14. On each side of each of the studs 24 and 25 are openings for the bolts 26 and 27 for the left hand unit and 26' and 27' for the right hand unit, respectively. These openings are positioned equidistantly from the center of their respective studs, but in the case of stud 24 one opening is defined in the bar closer to the longitudinal edge 28 thereof, while the other opening on the opposite side of the stud 24 is defined in the bar closer to the opposite longitudinal edge 29 thereof. Now in the case of stud 25 the openings are positioned so that the opening to the right of the stud is closer to the longitudinal edge 29 of the bar 12, while the other opening defined in the bar on the opposite side of the stud 25 is closer to the longitudinal edge 28 of the bar 12.

Figure 3:
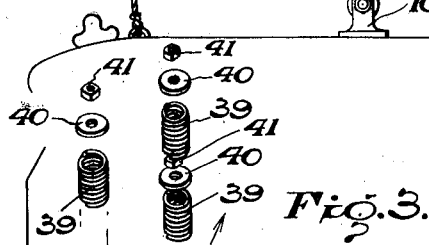
Figure 3 shows the several parts of the friction tension means separated or pulled apart in their superimposed relationship.
Figure 2:
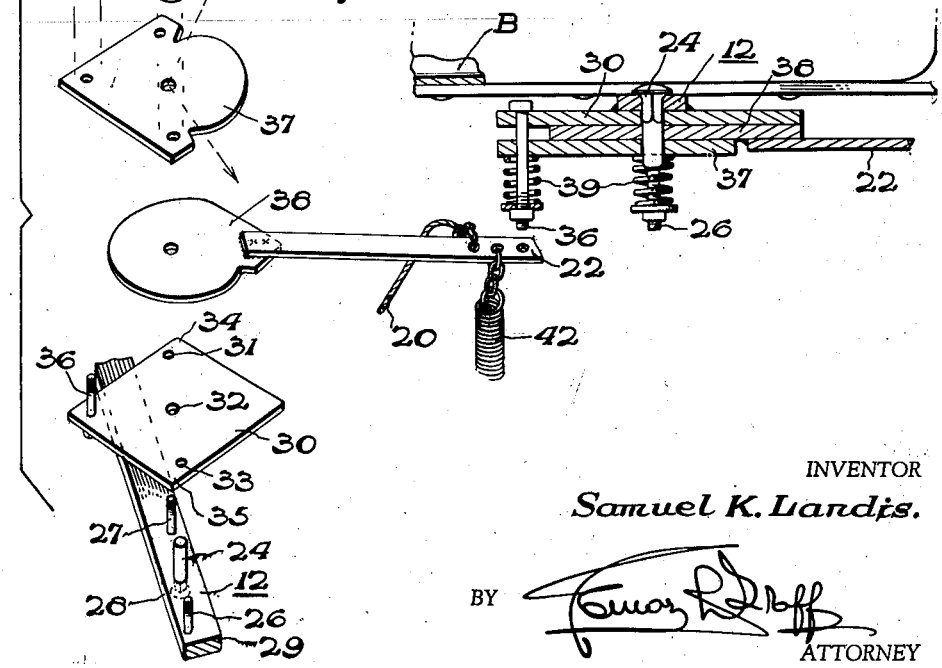
Figure 2 is a vertical cross section view of the connections with the top side up taken approximately on the section line 2—2 of the bottom view in Figure 1.

A plate 30 shown individually in Figure 3 and is a duplicate of the elements on stud 25 connected to stud 24 formed with three aligned openings 31, 32 and 33 and a similar plate serves as the base plate of each of the friction means above referred to in reference to arms 22 and 23. These openings 31, 32 and 33 are aligned on the bias with respect to the apices of the corners 34 and 35, so as to fit over the bolts 26 and 27 and the stud 24 or bolts 26' and 27' and the stud 25 on the duplicate side, which are likewise aligned on the bias and projecting from the support bar 12. The plates in one corner each has upwardly projecting bolts 36 and 36' adapted to cooperate with their respective bolts 26 and 27 and 26' and 27' to hold the upper plate 37 in proper position. Thus when assembled with the friction disc 38 between plate 30 and the top plate 37, the ends of bolts 26, 27 and 36 project upward over the top plate 37 to receive coiled springs 39, washer 40 and an adjusting nut 41. Adjustment of the nut 41 regulates the frictional resistance between the fixed plates 30 and 37 and the centrally apertured movable intermediate disc 38, which disc 38 turns on the stud 24 and has fixed to its surface one of the arms 22 or in the case of disc 38' to which is fixed the arm 23. Disc 38' of course, turns on stud 25. These arms are connected by a heavy spring 42 of greater strength than the resistance of the friction discs 38 and 38'. Therefore, the arms 22 and 23 will move together during minor trailer swaying and the resultant forces therefrom, but upon a major swaying with greater resultant forces the arms 22 and 23 will swing to different angular positions as shown in the dotted line positions in Figure 1.

The friction disc 38 connected to arm 22 may for example be notched on the left side edge just adjacent the connection to the arm 22, while the disc 38' connected to the arm 23 is notched on the right side edge and when arm 22 is swung or pulled to the right its unnotched edge will abut the bolt positioned closer to the longitudinal edge 29 of the support bar 12. As this occurs the arm 23 under a major swaying force continues to swing to the right at a much greater angle due to the notched side of disc 38' and the fact that the bolt 27' closer to the farther away edge 28 of the bar 12 does not stop the swing, until the arm 23 has swung to a much greater angle. As the arms 22 and 23 thus become angularly separated from their normal substantially parallel relation the heavy spring 42 is stretched and any major forces likely to cause swaying or hunting action of the trailer are blocked or compensated. Sway force in the opposite direction causes operation in the same manner, that is, the arm 22 when swung to the left will extend the spring 42, while the arm 23 will be stopped at the shortest swing by the bolt nearest edge 29 of bar 12.

During normal straight-away travel the cables 20 and 21 are retained under equalized tension by the heavy spring 42. This equal tension keeps the trailer and tow car in line and the strength of the spring 42 is sufficient to normally pull the trailer weight without any extension even should the coupler 10 become broken and the cables take over the complete towing strain. The spring 42, for example, may have a strength of 250 pounds on each side of the trailer.

When driving with a trailer attached to a car using a conventional hitch the swaying is of light, medium and heavy sways. The purpose of the friction discs 38 and 38' is to reduce about sixty percent of the light and medium sways so there will be no continued swaying or trailer hunting action. The friction discs also act as a brake in severe forces. Thus the trailer may sway once or twice and then by the resistance power of the friction discs such swaying will cease. Likewise these friction discs assist when turning corners and when backing the trailer.

Thus there is provided a novel durable and efficient safety device adapted to first substantially eliminate minor and major trailer sway; second, adapted to substantially eliminate relative swinging between the trailer and the tow car; and third, adapted to serve as an auxiliary hitch should the regular hitch become broken.

Without further description it is believed that this invention will now be clearly understandable and the advantages and improvements thereof over the prior art will be apparent. While only one embodiment of the invention is described and illustrated in detail, it is to be expressly understood that other combinations, modifications and arrangements of the parts which will now probably occur to others skilled in the art are to be considered a part hereof. To determine the scope of my invention, reference should be had to the appended claims.

What is claimed is:

1. Structure for reducing trailer swaying, in combination with a trailer hitch, comprising a transverse bar secured to the underside of a trailer, a pulley mounted for rotation adjacent each end of the bar, turnable friction means mounted adjacent each pulley on the underside of said bar, said friction means having arms affixed thereto projecting toward the trailer hitch coupling connection for concerted oscillation, a tension spring connected between the said arms adapted to normally maintain said arms in substantially parallel relation to each other, stop means on each side of each of said friction means arranged so that in either direction of oscillation one arm moves a greater distance than the other arm to extend said spring, a cable looped over each pulley at each end of the said bar, each cable connecting at one end to the end of one of said arms and extending toward its respective pulley in a direction opposite to the tensile stresses of said spring, and the opposite end of each cable connecting to the rear side of a towing vehicle, the resistance of said spring being greater than the resistance of said friction means, whereby minor trailer sway in either direction imparted to said arms from tension caused thereby on said cables is reduced by the resistance of said friction means and relatively greater trailer sway is reduced by the additive resistance of said spring.

2. Anti-sway means for attachment to the underside of a trailer comprising flexible side connections to each rear side of a tow car, angularly movable friction brake disc means connected to said connections for substantially eliminating trailer sway during forward motion by responding to the tension on said flexible side connections, an arm carried by each disc arranged for concerted oscillation, a tension spring connected between said arms maintaining a constant tension on said flexible side connections during straight-away travel, whereby said flexible side connections control actuation of both said friction brake discs and said spring in response to trailer swaying forces imparted to said flexible side connections and stop means on each side of each of said friction means arranged so that in either direction of oscillation one arm moves a greater distance than the other arm to extend said spring.

3. Trailer anti-sway and swing means comprising turnable friction means, an arm carried by each friction means, projecting toward the tow car, a support for said means connected to the underside of the trailer, a tension spring connected between each arm adapted to normally retain said arms in substantially parallel relation for a concerted angular oscillation, said spring being of greater strength than the said friction means, a cable connected to the free end of each of said arms extending away from said spring, said cable of each arm looping under sufficient tension to keep it taut over a pulley journalled on said support and connecting to the right and left side connections respectively of a tow vehicle and stop means on each side of each of said friction means arranged so that in either direction of oscillation one arm moves a greater angular distance than the other arm to extend said spring.

4. Trailer anti-sway means comprising a support bar for attachment to the underside of a trailer, a pulley journaled to said support bar adjacent each end thereof, friction brake units secured to said bar in spaced apart relation between said pulleys, said brake units each including a movable friction disc turnable on a stud extending from the bar, an elongated arm fixed to each disc projecting toward the front of the trailer, a tension spring connected to the spaced apart ends of the arms adapted to normally hold them in substantially parallel relation for a concerted angular oscillation, stop means on each side of each of said friction means arranged so that in either direction of oscillation one arm moves a greater angular distance than the other arm to extend said spring and a cable connected to the end of each arm and leading over a pulley on the right and left side respectively of the said support bar into connection with the right and left side respectively of a tow car normally held taut by the said spring.

5. Trailer anti-sway means comprising a support bar for attachment to the underside of a trailer, a pulley journalled to said support bar adjacent each end thereof, two sets of aligned projections on opposite sides of a stud on said bar surface arranged on the bias with respect to the longitudinal axis of the bar, whereby one projection is closer to one longitudinal edge of the bar than the other projection, said second set having its aligned projections arranged on a bias in an angular direction opposite to the first set of projections, a pair of superimposed plates formed with cooperating openings therein mounted over each set of projections and the stud, resiliently yieldable means to adjustably secure the plates together, a friction disc mounted on said stud between each set of said plates, an arm fixed to said respective discs projecting toward the front of said trailer, a spring of relatively greater resistance to tensile stress than said discs are to friction resistance connected between the free ends of said arms, and a taut cable connected to each arm leading over a pulley at each end of the bar, each cable connecting to the right and left sides respectively of a tow car, said arms being normally in spaced parallel relation, until a major swaying force exceeds the friction resistance of said discs and causes the friction disc of one unit to abut one of said projections of the first set on the bar prior to the abutment of the second friction disc unit with a projection of the second set nearer to the opposite longitudinal edge of the bar, thereby extending said spring to eliminate such major swaying forces.

6. Anti-sway means for trailers comprising a transverse support bar mounted across the underside of the trailer floor, a pair of spaced apart friction members mounted on said bar for oscillation in the same directions with respect to each other, forwardly projecting arms secured to each one of said friction members, a spring connected between said arms, stop means on each side of each of said friction members arranged so that in either direction of oscillation one arm moves a greater distance than the other arm to extend the spring, and draft equalizing cables connected to the free end of each arm and to each side, respectively of the rear of a tow car.

SAMUEL K. LANDIS.

REFERENCES CITED

The following references are of record in the file of this patent:

UNITED STATES PATENTS

| Number | Name | Date |
|---|---|---|
| 1,460,564 | Ashley | July 3, 1923 |